(12) United States Patent
Gutierrez Novelo

(10) Patent No.: US 9,503,742 B2
(45) Date of Patent: Nov. 22, 2016

(54) SYSTEM AND METHOD FOR DECODING 3D STEREOSCOPIC DIGITAL VIDEO

(75) Inventor: Manuel Rafael Gutierrez Novelo, Nueva Santa Maria (MX)

(73) Assignee: TD Vision Corporation S.A. de C.V., Col. Nueva Santa Maria (MX)

( * ) Notice: Subject to any disclaimer, the term of this patent is extended or adjusted under 35 U.S.C. 154(b) by 687 days.

(21) Appl. No.: 12/837,421

(22) Filed: Jul. 15, 2010

(65) Prior Publication Data
US 2010/0271462 A1   Oct. 28, 2010

Related U.S. Application Data

(63) Continuation of application No. 11/510,262, filed on Aug. 25, 2006, which is a continuation of application No. PCT/MX2004/000012, filed on Feb. 27, 2004.

(51) Int. Cl.
*H04N 7/12* (2006.01)
*H04N 19/42* (2014.01)
(Continued)

(52) U.S. Cl.
CPC .............. *H04N 19/42* (2014.11); *H04N 19/30* (2014.11); *H04N 19/44* (2014.11); *H04N 19/593* (2014.11); *H04N 19/597* (2014.11); *H04N 19/61* (2014.11); *H04N 19/70* (2014.11)

(58) Field of Classification Search
CPC ................................................... H04N 19/597
USPC ............ 375/240.01, 240.14, 240.27, 240.23; 348/43, 46
IPC ......................................................... H04N 7/12
See application file for complete search history.

(56) References Cited

U.S. PATENT DOCUMENTS

| | | | |
|---|---|---|---|
| 5,579,413 | A | 11/1996 | Bjøntegaard |
| 5,612,735 | A | 3/1997 | Haskell et al. |
| 5,619,256 | A | 4/1997 | Haskell et al. |
| 5,652,616 | A | 7/1997 | Chen et al. |

(Continued)

FOREIGN PATENT DOCUMENTS

| | | |
|---|---|---|
| CN | 1450816 A | 10/2003 |
| EP | 0639031 | 2/1995 |

(Continued)

OTHER PUBLICATIONS

Tseng et al., "Compatible Video Coding of Stereoscopic Sequences Using MPEG-2's Scalability and Interlaced Structure," International Workshop on HDTV '94, Oct. 1994, Torino, Italy.

(Continued)

*Primary Examiner* — Young Lee
(74) *Attorney, Agent, or Firm* — Knobbe Martens Olson & Bear LLP

(57) ABSTRACT

Described herein is a MPEG-2 compatible stereoscopic 3D-video image digital decoding method and system. In order to obtain 3D-images from a digital video stream, modifications are made to the current MPEG2 decoders, by means of software and hardware changes in different parts of the decoding process. Namely, the video_sequence structures of the video data stream are modified via software to include the necessary flags at the bit level of the image type in the TDVision® technology. Modifications are also made in the decoding processes as well as in decoding the information via software and hardware, wherein a double output buffer is activated, a parallel and difference decoding selector is activated, the decompression process is executed, the corresponding output buffer is displayed; and the decoder is programmed via software to simultaneously receive and decode two independent program streams, each with an TDVision® stereoscopic identifier.

1 Claim, 5 Drawing Sheets

(51) Int. Cl.
H04N 19/597 (2014.01)
H04N 19/30 (2014.01)
H04N 19/61 (2014.01)
H04N 19/593 (2014.01)
H04N 19/44 (2014.01)
H04N 19/70 (2014.01)

(56) References Cited

U.S. PATENT DOCUMENTS

| | | |
|---|---|---|
| 5,815,601 A | 9/1998 | Katata et al. |
| 5,886,736 A | 3/1999 | Chen |
| 5,963,257 A | 10/1999 | Katata et al. |
| 5,978,515 A | 11/1999 | Katata et al. |
| 6,043,838 A | 3/2000 | Chen |
| 6,055,012 A | 4/2000 | Haskell et al. |
| 6,072,831 A | 6/2000 | Chen |
| 6,097,759 A | 8/2000 | Murakami et al. |
| 6,144,701 A | 11/2000 | Chiang et al. |
| 6,148,109 A | 11/2000 | Boon et al. |
| 6,151,362 A | 11/2000 | Wang |
| 6,292,588 B1 | 9/2001 | Shen et al. |
| 6,345,123 B1 | 2/2002 | Boon |
| 6,370,193 B1 | 4/2002 | Lee |
| 6,370,276 B2 | 4/2002 | Boon |
| 6,377,625 B1 | 4/2002 | Kim |
| 6,456,432 B1 | 9/2002 | Lazzaro et al. |
| 6,633,676 B1 | 10/2003 | Kleihorst et al. |
| 6,636,644 B1 | 10/2003 | Itokawa |
| 6,658,056 B1 | 12/2003 | Duruoz et al. |
| 6,661,914 B2 | 12/2003 | Dufour |
| 6,665,445 B1 | 12/2003 | Boon |
| 6,678,331 B1 | 1/2004 | Moutin et al. |
| 6,678,424 B1 | 1/2004 | Ferguson |
| 7,136,415 B2 | 11/2006 | Yun et al. |
| 7,277,121 B2 | 10/2007 | Mashitani et al. |
| 7,636,088 B2 | 12/2009 | Nomura et al. |
| 2002/0009137 A1 | 1/2002 | Nelson et al. |
| 2003/0048354 A1 | 3/2003 | Takemoto et al. |
| 2003/0095177 A1 | 5/2003 | Yun et al. |
| 2003/0190079 A1 | 10/2003 | Penain et al. |
| 2003/0202592 A1 | 10/2003 | Sohn et al. |
| 2004/0008893 A1 | 1/2004 | Itoi et al. |
| 2004/0027452 A1 | 2/2004 | Yun et al. |
| 2004/0101043 A1 | 5/2004 | Flack et al. |
| 2004/0120396 A1 | 6/2004 | Yun et al. |
| 2004/0252186 A1 | 12/2004 | Mashitani et al. |
| 2006/0133493 A1 | 6/2006 | Cho et al. |
| 2007/0041442 A1 | 2/2007 | Novelo |
| 2010/0039499 A1 | 2/2010 | Nomura et al. |
| 2010/0271463 A1 | 10/2010 | Novelo |

FOREIGN PATENT DOCUMENTS

| | | |
|---|---|---|
| JP | 07-240943 | 9/1995 |
| JP | 07-296185 | 11/1995 |
| JP | 09-139957 | 5/1997 |
| JP | 09-237353 | 9/1997 |
| JP | 11-069346 | 3/1999 |
| JP | 11-113026 | 4/1999 |
| JP | 11-509998 | 8/1999 |
| JP | 2000-020757 | 1/2000 |
| JP | 2001054140 | 2/2001 |
| JP | 2002-519792 | 7/2002 |
| JP | 2003-319419 | 11/2003 |
| KR | 1997-0060973 | 8/1997 |
| WO | WO 9817068 | 4/1998 |
| WO | WO 03/092304 | 11/2003 |

OTHER PUBLICATIONS

Harman, "Home Based 3D Entertainment—An Overview," Proceedings of the International Conference on Image Processing, 2000, vol. 1, Sep. 2000, pp. 1-4.

Gotoh, H. "Gotoh Hiroshige's Monthly Report," DOS/V Power Report, Japan, Impress Corporation, Jul. 1, 2003, vol. 13, No. 7, pp. 125-126.

Nakasu, MPEG-2 Video Encoding Schemes and Their Features, Academic Literature, Etc. 2007-51282-007, Jun. 1, 2010, pp. 2-6.

Nakasu, E. "Comprehensible MPEG2 and MPEG2 image coding system and feature," Video a, Dec. 1, 1992, Shasin-kogyo Publisher, vol. 15, No. 12, pp. 34-38.

Notice of Reasons for Rejection for Japanese Patent Application No. P2005-512205 dated Jun. 22, 2010 by Japanese Patent Office.

Notice of Reasons for Rejection for Japanese Patent Application No. P2007-500701 dated Jun. 1, 2010 by Japanese Patent Office.

Notice of Reasons for Rejection for Japanese Patent Application No. P2007-500700 dated Jun. 1, 2010 by Japanese Patent Office.

Notice of Request for Submission of Argument for Korean Patent Application No. 10-2006-7020051 dated Jul. 13, 2010.

Notice of Request for Submission of Argument for Korean Patent Application No. 10-2006-7020050 dated Jul. 13, 2010.

Office Action for Canadian Patent Application No. 2,557,534 dated Feb. 21, 2011 by Canadian Intellectual Property Office.

Examination Report for European Patent Application No. 04715594.0 dated Oct. 18, 2010 by European Patent Office.

Examination Report for European Patent Application No. 04715595.7 dated Oct. 18, 2010 by European Patent Office.

First Office Action for Chinese Patent Application No. 200480042753.3 dated Aug. 8, 2008 by State Intellectual Property Office of P.R.C.

Second Office Action for Chinese Patent Application No. 200480042753.3 dated Mar. 20, 2009 by State Intellectual Property Office of P.R.C.

Third Office Action for Chinese Patent Application No. 200480042753.3 dated Feb. 24, 2010 by State Intellectual Property Office of P.R.C.

First Office Action for Chinese Patent Application No. 2004800425881 dated Jun. 13, 2008 by State Intellectual Property Office of P.R.C.

Second Office Action for Chinese Patent Application No. 2004800425881 dated May 8, 2009 by State Intellectual Property Office of P.R.C.

Third Office Action for Chinese Patent Application No. 2004800425881 dated Mar. 18, 2010 by State Intellectual Property Office of P.R.C.

First Office Action for Chinese Patent Application No. 201010227674.7 dated Jul. 20, 2011 by State Intellectual Property Office of P.R.C.

First Office Action for Chinese Patent Application No. 201010221966.X dated Jun. 23, 2011 by State Intellectual Property Office of P.R.C.

Notice of Reasons for Rejection for Japanese Patent Application No. P2007-500701 dated Jan. 5, 2010 by Japanese Patent Office.

Notice of Reasons for Rejection for Japanese Patent Application No. P2007-500700 dated Jan. 12, 2010 by Japanese Patent Office.

Final Rejection for Japanese Patent Application No. P2001-500701 dated Dec. 21, 2010 by Japanese Patent Office.

Final Rejection for Japanese Patent Application No. P2001-500700 dated Dec. 21, 2010 by Japanese Patent Office.

Notice of Final Rejection for Korean Patent Application No. 10-2006-7020051 dated May 24, 2011.

Notice of Final Rejection for Korean Patent Application No. 10-2006-7020050 dated May 23, 2011.

Notice of Request for Submission of Argument for Korean Patent Application No. 10-2011-7022035 dated Dec. 15, 2011.

Notice of Request for Submission of Argument for Korean Patent Application No. 10-2011-7022011 dated Dec. 14, 2011.

Chien, et al., Efficient Stereo Video Coding System For Immersive Teleconference With Two-Stage Hybrid Disparity Estimation Algorithm, DSP/IC Design Lab, Graduate Institute of Electronics Engineering and Department of Electrical Engineering, National Taiwan University 1, Sec. 4, Roosevelt Rd., Taipei, Taiwan, 2003.

Jiang, et al., A Hybrid Scheme for Low Bit-Rate Coding of Stereo Images, IEEE Transactions on Image Processing, vol. 11, No. 2, Feb. 2002.

(56) References Cited

OTHER PUBLICATIONS

Naito, 3D-HDTV Digital Coding Scheme Conforming To Mpeg-2 With Full Use Of Disparity Compensation, Electronics and Communications in Japan, Part 1, vol. 85, No. 2, 2002, Translated from Denshi Joho Tsushin Gakkai Ronbunshi, vol. J83-B, No. 5, May 2000, pp. 739-747.

Olm, Encoding and Reconstruction of Multiview Video Objects, IEEE Signal Processing Magazine, May 1999, vol. 16, pp. 47-54.

Perkins, Data Compression of Steropairs, IEEE Transactions on communications, vol. 40, No. 4, Apr. 1992.

Puri, et al., Basics of Stereoscopic Video, New Compression Results with MPEG-2 and a Proposal for MPEG-4, Signal Processing: Image Communication 10, 1997, pp. 201-234.

Schertz, Source Coding of Stereoscopic Television Pictures, Institut fur Rundfunktechnik, FXG, 1992, 462-464.

Seferidis, et al., Improved Disparity Estimation in Stereoscopic Television, IEEE Xplore, vol. 29, No. 9, 1993.

Sethuraman, et al., A Multiresolution Framework For Stereoscopic Image Sequence Compression, Proc. of ICIP-95, vol. II, pp. 361-365, IEEE Computer Society Press, 1994.

Siegel, et al., Compression and Interpolation of 3D-Stereoscopic and Multi-View Video, The Rototics Institute, Carnegie Mellon University, Pittsburgh, PA 15213, SAE vol. 3012, 1997, 227-238.

Tengecharoen, et al., Stereo Image Compression by Quadrant Vector Quantization, Faculty of Engineering, and Research Center for Communications and Information Technology (ReCCIT), King Mongkut's Institute of Technology Ladkrabang, Bangkok 10520, Thailand, 2003.

Yan, et al., Stereo Video Coding Based on Frame Estimation and Interpolation, IEEE Transactions on Broadcasting, vol. 49, No. 1, Mar. 2003, pp. 14-21.

Zhu, Fast Disparity Estimation Algorithms for Stereo Video Coding Based on MPEG-2, Bulletin of Science and technology, vol. 19, No. 1, Jan. 31, 2003.

SYSTEM AND METHOD FOR DECODING 3D STEREOSCOPIC DIGITAL VIDEO

CROSS-REFERENCE TO RELATED APPLICATION

This application is a continuation of copending U.S. application Ser. No. 11/510,262, titled "Stereoscopic 3D-Video Image Digital Decoding System and Method," filed Aug. 25, 2006, which is a continuation of PCT Application No. PCT/MX2004/00012 filed on Feb. 27, 2004 in the Spanish language. The disclosures of all the above-referenced applications, publications, and patents are considered part of the disclosure of this application, and are incorporated by reference herein in their entirety.

FIELD OF THE INVENTION

The present invention is related to stereoscopic video image display in the 3DVisor® device and, particularly, to a video image decoding method by means of a digital data compression system, which allows the storage of three-dimensional information by using standardized compression techniques.

BACKGROUND OF THE INVENTION

Presently, data compression techniques are used in order to decrease the bits consumption in the representation of an image or a series of images. The standardization works were carried out by a group of experts of the International Standardization Organization. Presently, the methods are usually known as JPEG (Joint Photographic Expert Group), and MPEG (Moving Pictures Expert Group).

A common characteristic of these techniques is that the image blocks are processed by means of the application of a transform adequate for the block, usually known as Discrete Cosine Transform (DCT). The formed blocks are submitted to a quantization process, and then coded with a variable-length code.

The variable-length code is a reversible process, which allows the exact reconstruction of that which has been coded with the variable-length code.

The display of digital video signals includes a certain number of image frames (30 to 96 fps) displayed or represented successively at a 30 to 75 Hz frequency. Each image frame is still an image formed by a pixels array, of the display resolution of a particular system. By example, the VHS system has a display resolution of 320 columns and 480 rows, the NTSC system has a display resolution of 720 columns and 486 rows, and the high definition television system (HDTV) has a display resolution of 1360 columns and 1020 rows. In reference to a digitized form of low resolution, 320 columns by 480 rows VHS format, a two-hour long movie could be equivalent to 100 gigabytes of digital video information. In comparison, a conventional compact optical disk has an approximate capacity of 0.6 gigabytes, a magnetic hard disk has a 1-2 gigabyte capacity, and the present compact optical disks have a capacity of 8 or more gigabytes.

All images we watch at the cinema and TV screens are based on the principle of presenting complete images (static images, like photographs) at a great speed. When they are presented in a fast and sequential manner at a 30 frames per second speed (30 fps) we perceive them as an animated image due to the retention of the human eye.

In order to codify the images to be presented in a sequential manner and form video signals, each image needs to be divided in rows, where each line is in turn divided in picture elements or pixels, each pixel has two associated values, namely, luma and chroma. Luma represents the light intensity at each point, while luma represents the color as a function of a defined color space (RGB), which can be represented by three bytes.

The images are displayed on a screen in a horizontal-vertical raster, top to bottom and left to right and so on, cyclically. The number of lines and frequency of the display can change as a function of the format, such as NTSC, PAL, or SECAM.

The video signals can be digitized for storage in digital format, after being transmitted, received, and decoded to be displayed in a display device, such as a regular television set or the 3DVisor®, this process is known as analog-to-digital video signal coding-decoding.

By definition, MPEG has two different methods for interlacing video and audio in the system streams.

The transport stream is used in systems with a greater error possibility, such as satellite systems, which are susceptible to interference. Each package is 188 bytes long, starting with an identification header, which makes recognizing gaps and repairing errors possible. Various audio and video programs can be transmitted over the transport stream simultaneously on a single transport stream; due to the header, they can be independently and individually decoded and integrated into many programs.

The program stream is used in systems with a lesser error possibility, as in DVD playing. In this case, the packages have a variable-length and a size substantially greater than the packages used in the transport stream. As a main characteristic, the program stream allows only a single program content.

Even when the transport and program streams handle different packages, the video and audio formats are decoded in an identical form.

In turn, there are three compression types, which are applied to the packages above, e.g. time prediction, compression, and space compression.

Decoding is associated to a lengthy mathematical process, which purpose is to decrease the information volume. The complete image of a full frame is divided by a unit called macroblock, each macroblock is made up of a 16 pixels×16 pixels matrix, and is ordered and named top to bottom and left to right. Even with a matrix array on screen, the information sent over the information stream follows a special sequential sequence, i.e. the macroblocks are ordered in ascending order, this is, macroblock0, macroblock1, etc.

A set of consecutive macroblocks represents a slice; there can be any number of macroblocks in a slice given that the macroblocks pertain to a single row. As with the macroblocks, the slices are numbered from left to right and bottom to top. The slices should cover the whole image, as this is a form in which MPEG2 compresses the video, a coded image not necessarily needs samples for each pixel. Some MPEG profiles require handling a rigid slice structure, by which the whole image should be covered.

U.S. Pat. No. 5,963,257 granted on Oct. 5, 1999 to Katata et al., protects a flat video image decoding device with means to separate the coded data by position areas and image form, bottom layer code, predictive coding top layer code, thus obtaining a hierarchical structure of the coded data; the decoder has means to separate the data coded in the hierarchical structure in order to obtain a high quality image.

U.S. Pat. No. 6,292,588 granted on Sep. 18, 2001 to Shen et al., protects a device and method for coding predictive flat images reconstructed and decoded from a small region, in such way that the data of the reconstructed flat image is generated from the sum of the small region image data and the optimal prediction data for said image. Said predictive decoding device for an image data stream includes a variable-length code for unidimensional DCT coefficients. U.S. Pat. No. 6,370,276 granted on Apr. 9, 2002 to Boon, uses a decoding method similar to the above.

U.S. Pat. No. 6,456,432 granted on Sep. 24, 2002 to Lazzaro et al., protects a stereoscopic 3D-image display system, which takes images from two perspectives, displays them on a CRT, and multiplexes the images in a field-sequential manner with no flickering for both eyes of the observer.

U.S. Pat. No. 6,658,056 granted on Dec. 2, 2003 to Duruoz et al., protects a digital video decoder comprising a logical display section responding to a "proximal field" command to get a digital video field of designated locations in an output memory. The digital video display system is equipped with a MPEG2 video decoder. Images are decoded as a memory buffer, the memory buffer is optimized maintaining compensation variable tables and accessing fixed memory pointer tables displayed as data fields.

U.S. Pat. No. 6,665,445 granted on Dec. 16, 2003 to Boon, protects a data structure for image transmission, a flat images coding method and a flat images decoding method. The decoding method is comprised of two parts, the first part to codify the image-form information data stream, the second part is a decoding process for the pixel values of the image data stream, both parts can be switched of the flat image signal coding.

U.S. Pat. No. 6,678,331 granted on Jan. 13, 2004 to Moutin et al., protects a MPEG decoder, which uses a shared memory. Actually, the circuit includes a microprocessor, a MPEG decoder, which decodes a flat image sequence, and a common memory for the microprocessor, and the decoder. It also includes a circuit for evaluating the decoder delay, and a control circuit for determining the memory priority for the microprocessor or the decoder.

U.S. Pat. No. 6,678,424 granted on Jan. 13, 2004 to Ferguson, protects a behavior model for a real-time human vision system; actually, it processes two image signals in two dimensions, one derived from the other, in different channels.

BRIEF DESCRIPTION OF THE INVENTION

It is an object of the present invention to provide a stereoscopic 3D-video image digital decoding system and method, comprised of changes in software and changes in hardware.

It is an additional object of the present invention to provide a decoding method where the normal video_sequence process is applied to the coded image data, i.e. variable_length_decoding (VLD), inverse_scan; inverse_quantization, inverse_discrete_cosine_transform (IDCT), and motion_compensation.

It is also an object of the present invention to make changes in the software information for decoding the identification of the video format, 2D-images MPEG2 backward compatibility, discriminating a TDVision® type image, storing the last image buffer, applying information decoding, applying error correction and storing the results in the respective channel buffer.

It is still another object of the present invention to provide a decoding method with the video_sequence process normal form, in such a way that when a TDVision® type image is found, the buffer of the last complete image is stored in the left or right channel buffers.

It is also another object of the present invention to provide a decoding process in which two interdependent (difference) video signals can be sent within the same video_sequence, in which information decoding is applied and is stored as a B type frame.

It is still another object of the present invention to provide a decoding process in which error correction is applied to the last obtained image when the movement and color correction vectors are applied.

It is also an object of the present invention to program the decoder by software, to simultaneously receive and codify two independent program streams.

It is still another object of the present invention to provide a decoding system, which decodes the 3D-image information via hardware, in which a double output buffer is activated.

It is another object of the present invention to provide a decoding system of 3D-image information, which activates an image-decoding selector in parallel and by differences.

It is also another object of the present invention to provide a 3D-image information decoding system, which executes the decompression process and displays the corresponding output buffer.

DETAILED DESCRIPTION OF THE INVENTION

The combination of hardware and software algorithms makes possible the stereoscopic 3D-image information compression, which are received as two independent video signals but with the same time_code, corresponding to the left and right signals coming from a 3Dvision® camera, by sending two simultaneous programs with stereoscopic pair identifiers, thus promoting the coding-decoding process. Also, two interdependent video signals can be handled by obtaining their difference, which is stored as a "B" type frame with the image type identifier. As the coding process was left open in order to promote the technological development, it is only necessary to follow this decoding process, namely: apply variable-length decoding to the coded data where a substantial reduction is obtained, but a look-up table should be used to carry out decoding; apply an inverse scan process; apply an inverse quantization process in which each data is multiplied by a scalar; apply the inverse cosine transform function; apply error correction or motion compensation stage and eventually obtain the decoded image.

The novel characteristics of this invention in connection with its structure and operation method will be better understood from the description of the accompanying figures, together with the attached specification, where similar numerals refer to similar parts and steps.

Figure 1:
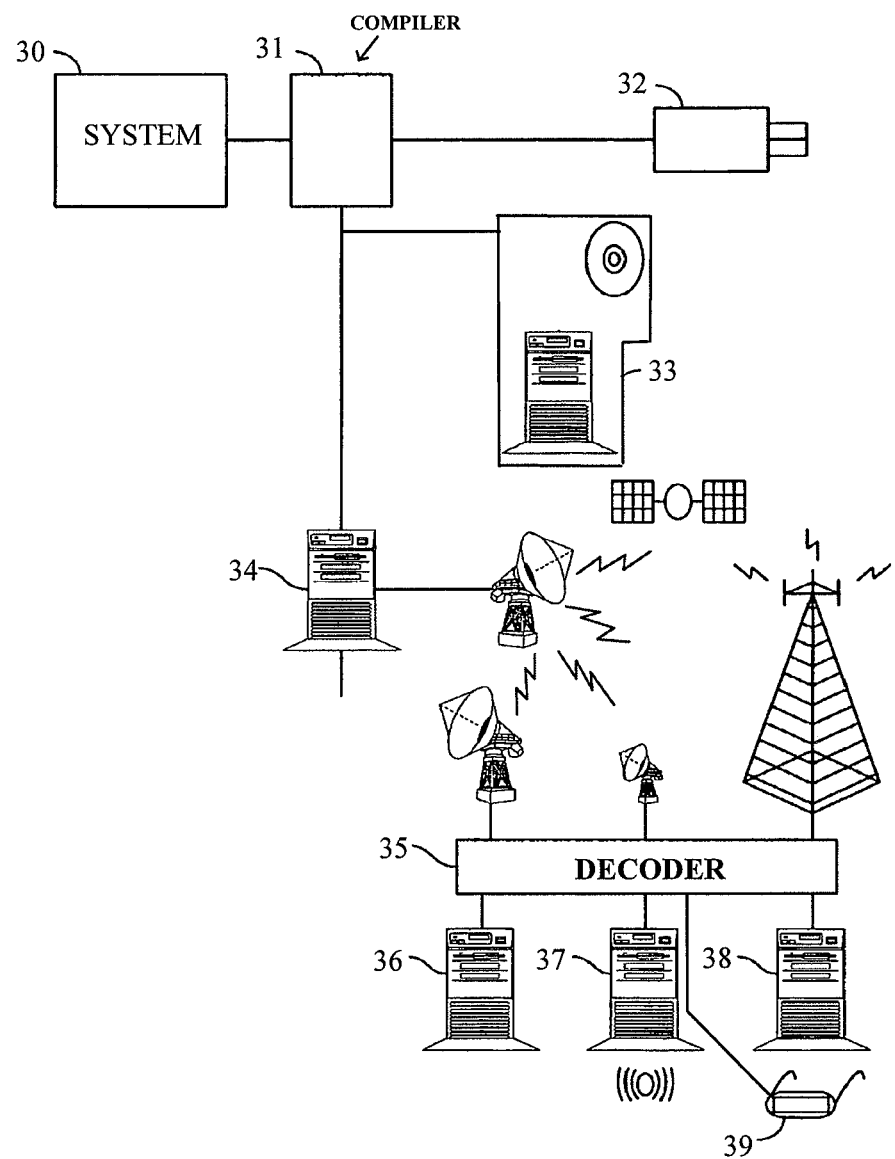
FIG. 1 represents one embodiment of a technology map

FIG. 1 represents the technology map to which the subject object of the present invention pertains. It shows a stereoscopic 3D-image coding and decoding system and corresponding method. The images come from a stereoscopic camera (32), the information compiled in (31) and are displayed in any adequate system (30) or (33). The information is coded in (34) and then it can be transmitted to a system having an adequate previous decoding stage such as (35), which may be a cable system (36), a satellite system (37), a high definition television system (38) or a stereoscopic vision system such as TDVision®'s 3DVisors® (39).

Figure 2:
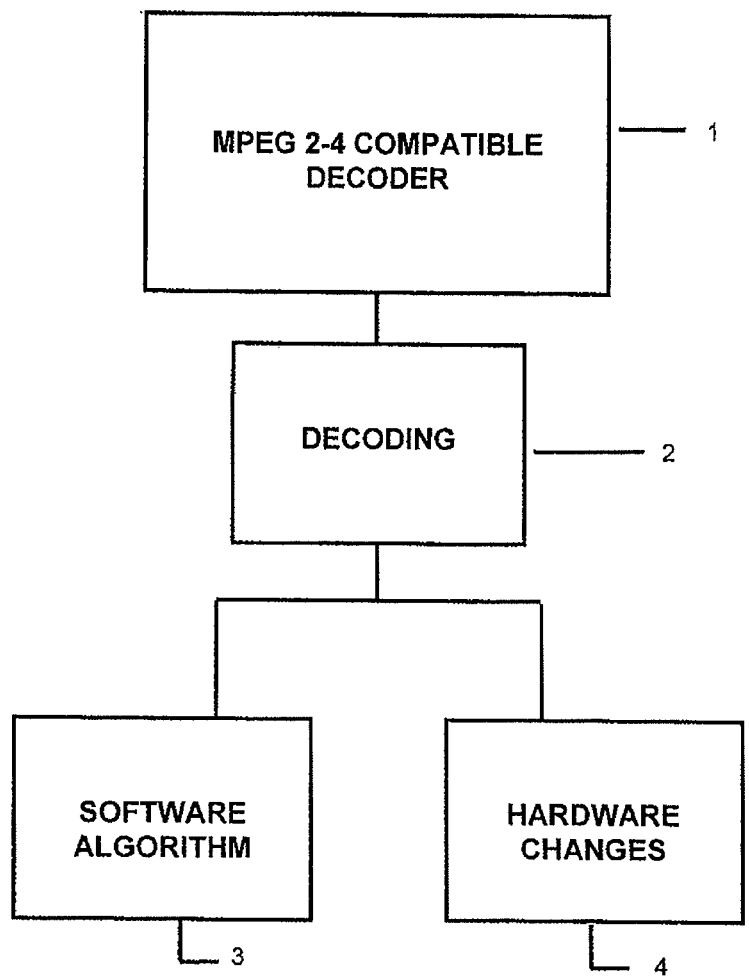
FIG. 2 shows a flowchart in which the steps of one embodiment of a process are outlined.

FIG. 2 shows a flowchart in which the steps of the process are outlined. The objective is to obtain three-dimensional images from a digital video stream by making modifications to the current MPEG2 decoders, and changes to software (3) and hardware (4) in the decoding process (2): the decoder (1) should be compatible with MPEG2-4.

Figure 3:
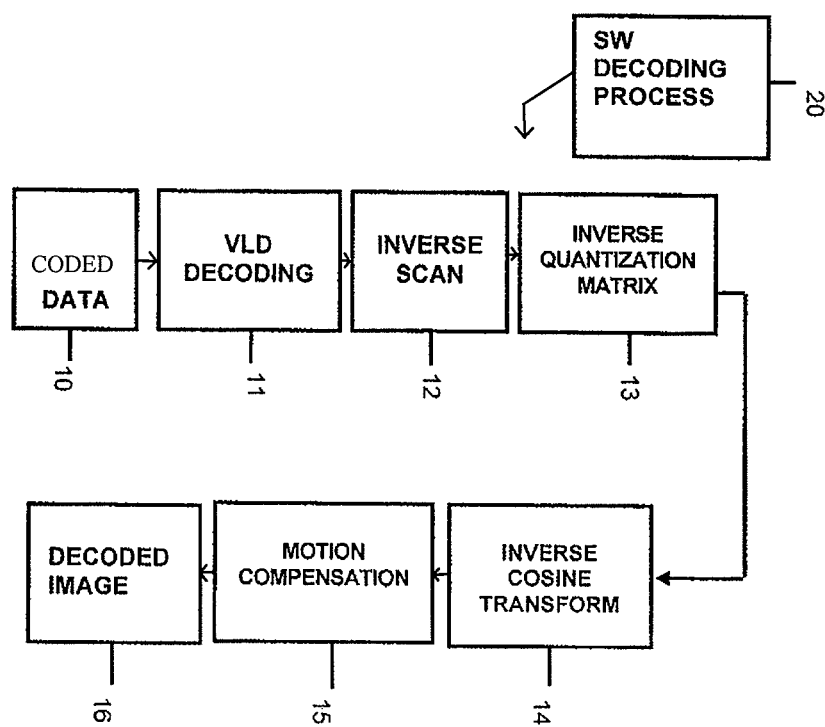
FIG. 3 illustrates structures that can be modified and the video_sequence of the data stream in order to identify the TDVision® technology image type at the bit level.

FIG. 3 outlines the structures that should be modified and the video_sequence of the data stream in order to identify the TDVision® technology image type at the bit level.

Each of the stages of the decoding process is detailed below (20):

The coded data (10) are bytes with block information, macroblocks, fields, frames, and MPEG2 format video images.

Variable_length_decoding (11) (VLC, Variable-length Decoder) is a compression algorithm in which the most frequent patterns are replaced by shorter codes and those occurring less frequently are replaced by longer codes. The compressed version of this information occupies less space and can be transmitted faster by networks. However, it is not an easily editable format and requires decompression using a look-up table.

For example, the word BEETLE

| Letter | ASCII Code | VLC |
|--------|-----------|-----------|
| B | 01000010 | 0000 0010 10 |
| E | 0110 0101 | 11 |
| L | 0110 1100 | 0001 01 |
| T | 0111 0100 | 0100 |

Therefore, the ASCII code for the word is:
0100 0010 0110 0101 0110 0101 0111 01000 0110 1100 0110 0101
in VLC: 0000 0010 10 11 11 0100 00010 01 11.

A substantial decrease is noted, however, in order to go back from VLC to the word 'Beetle' a search in the look-up table is needed to decode the bit stream, this is made by exact comparison of the read bits.

Inverse scan (12): The information should be grouped by blocks, and by coding the information with the VLC a linear stream is obtained. The blocks are 8×8 data matrixes, so it is necessary to convert the linear information in a square 8×8 matrix. This is made in a descending zigzag manner, top to bottom and left to right in both sequence types, depending on whether it is a progressive image or an interlaced image.

Inverse Quantization (13): It consists simply in multiplying each data value by a factor. When codified, most of the data in the blocks are quantized to remove information that the human eye is not able to perceive, the quantization allows to obtain a greater MPEG2 stream conversion, and it is also required to perform the inverse process (Inverse quantization) in the decoding process.

Inverse cosine transform (14) (IDCT, inverse_discrete_cosine_transform): The data handled within each block pertain to the frequency domain, this inverse cosine transform allows to return to the samples of the space domain. Once the data in the IDCT have been transformed, pixels, colors and color corrections can be obtained.

Motion compensation (15) allows to correct some errors generated before the decoding stage of MPEG format, motion compensation takes as a reference a previous frame and calculates a motion vector relative to the pixels (it can calculate up to four vectors), and uses them to create a new image. This motion compensation is applied to the P and B type images, where the image position is located over a "t" time from the reference images. Additionally to the motion compensation, the error correction is also applied, as it is not enough to predict the position of a particular pixel, but a change in its color can also exist. Thus, the decoded image is obtained (16).

To decode a P or B type image, the reference image is taken, the motion vectors are algebraically added to calculate the next image, and finally the error correction data is applied, thus generating the decoded image successfully. Actually, in the video_sequence, two interdependent video signals exist, "R-L=delta, the delta difference is that stored as a B type stereoscopic pair frame with TDVision® identifier and which is constructed at the moment of decoding by differences from the image. This is, R-delta=L and L-delta=R, the left image is constructed from the difference with the right image, which in turn is constructed from the difference with the left image.

The previous process is outlined in such a way that the left or right signal is taken, both are stored in a temporary buffer, then the difference between the left and right signals is calculated, and then it is coded as a B type image stored in the video_sequence to be later decoded by differences from said image.

In the decoding process it can be deducted that the data inputted by the VLC stage are much smaller than the data outputted by the same stage.

MPEG video sequence structure: This is the maximum structure used in the MPEG2 format and has the following format:
Video sequence (Video_Sequence)
Sequence header (Sequence_Header)
Sequence extension (Sequence_Extension)
User Data (0) and Extension (Extension_and_User_Data (0))
Image group header (Group_of_Picture_Header)
User Data (1) and Extension (Extension_and_User_Data (1))
Image header (Picture_Header)
Coded image extension (Picture_Coding_Extension)
User Data (2) and Extensions (Extension_and_User_Data (2))
Image Data (Picture_Data)
Slice(Slice)
Macroblock (Macroblock)
Motion vectors (Motion_Vectors)
Coded Block Pattern (Coded_Block_Pattern)
Block (Block)
Final Sequence Code (Sequence_end_Code)

These structures make up the video sequence. A video sequence is applied for MPEG format, in order to differentiate each version there should be a validation that immediately after the sequence header, the sequence extension is present; should the sequence extension not follow the header, then the stream is in MPEG1 format.

At the beginning of a video sequence, the sequence_header and sequence_extension appear in the video_sequence. The sequence_extension repetitions should be identical on the first try and the "s" repetitions of the sequence_header vary little compared to the first occurrence, only the portion defining the quantization matrixes should change. Having sequences repetition allows a random access to the video stream, i.e., if the decoder wants to start playing at the middle of the video stream this may be done, as it only needs to find the sequence_header and sequence_extension prior to that moment in order to decode the following images. This also happens for video streams that could not start from the beginning, such as a satellite decoder turned on after the transmission time.

The full video signal coding-decoding process is comprised of the following steps:

Digitizing the video signals, which can be done in NTSC, PAL or SECAM format.
Storing the video signal in digital form
Transmitting the signals
Recording the digital video stream in a physical media (DVD, VCD, MiniDV)
Receiving the signals
Playing the video stream
Decoding the signal
Displaying the signal It is essential to double the memory to be handled by the adequate DSP and have the possibility of disposing of up to 8 output buffers, which allow the previous and simultaneous representation of a stereoscopic image on a device such as TDVision®'s 3DVisor®

Actually, two channels should be initialized when calling the programming API of the DSP as, by example, the illustrative case of the Texas Instruments TMS320C62X DSP.

MPEG2VDEC_create (const IMPEG2VDEC_fxns*fxns, const MEPG2VDEC_Params* params).

Where IMPEG2VDEC_fxns y MEPG2VDEC_Params are pointer structures defining the operation parameters for each video channel, e.g.:

3DLhandle=MPEG2VDEC_create (fxns3DLEFT, Params3DLEFT).
3DRhandle=MPEG2VDEC_create(fxns3DRIGHT, Params3DRIGHT.

Thereby enabling two video channels to be decoded and obtaining two video handlers, one for the left-right stereoscopic channel.

A double display output buffer is needed and by means of software, it will be defined which of the two buffers should display the output by calling the AP function:

Namely, MPEG2VDEC_APPLY(3DRhandle, inputR1, inputR2, inputR3, 3doutright_pb, 3doutright_fb).
MPEG2VDEC_APPLY(3DLhandle, inputL1, inputL2, inputL3, 3doutleft_pb, 3doutleft_fb).

This same procedure can be implemented for any DSP, microprocessor or electronic device with similar functions.

Where 3DLhandle is the pointer to the handle returned by the DSP's create function, the input1 parameter is the FUNC_DECODE_FRAME or FUNC_START_PARA address, input2 is the pointer to the external input buffer address, and input3 is the size of the external input buffer size.

3doutleft_pb is the address of the parameter buffer and 3doutleft_fb is the beginning of the output buffer where the decoded image will be stored.

The timecode and timestamp will be used for output to the final device in a sequential, synchronized manner.

It is essential to double the memory to be handled by the DSP and have the possibility of disposing of up to 8 output buffers which allow the previous and simultaneous display of a stereoscopic image on a device such as TDVision® Corporation's 3DVisor®.

The integration of software and hardware processes is carried out by devices known as DSP, which execute most of the hardware process. These DSP are programmed by a C and Assembly language hybrid provided by the manufacturer. Each DSP has its own API, consisting of a functions list or procedure calls located in the DSP and called by software.

With this reference information, the present application for MPEG2 format-compatible 3D-images decoding is made.

Actually, at the beginning of a video sequence the sequence header (sequence_header) and the sequence extension always appear. The repetitions of the sequence extension should be identical to the first. On the contrary, the sequence header repetitions vary a little as compared to the first occurrence, only the portion defining the quantization matrixes should change.

Figure 4:
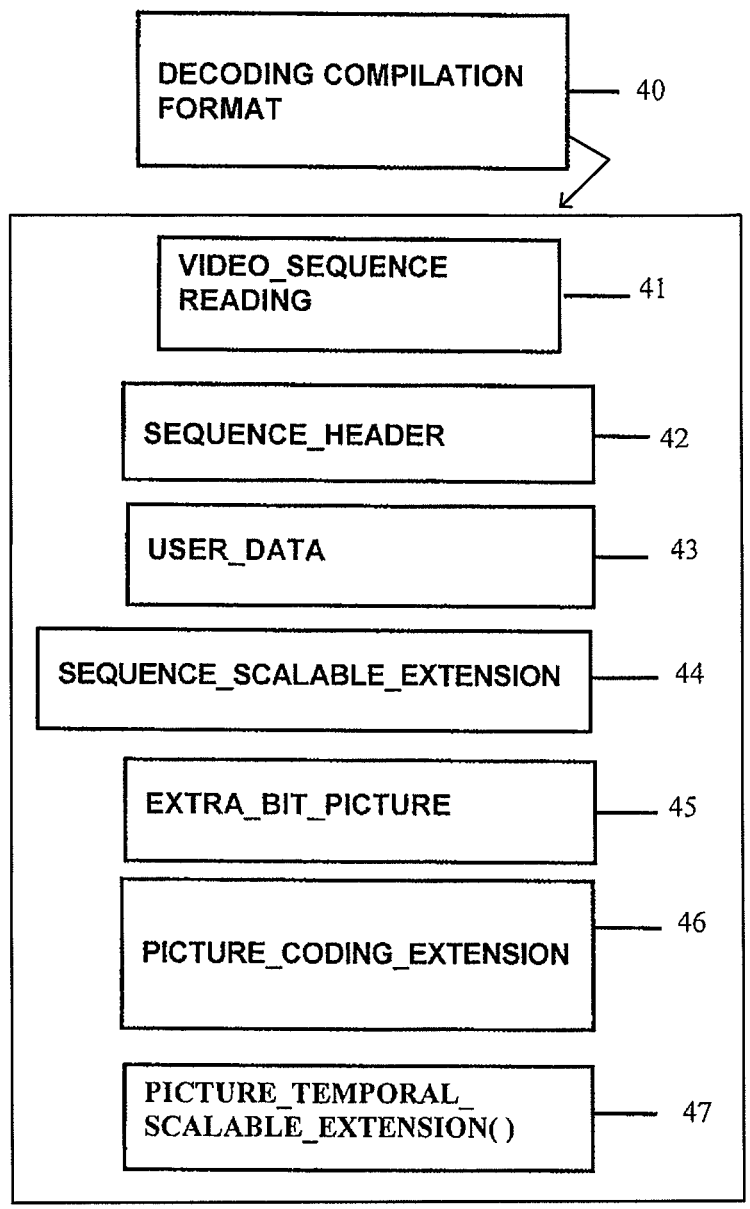
FIG. 4 shows one embodiment of the compilation software format for the TDVision® decoding method (40).

FIG. 4 shows the compilation software format for the TDVision® decoding method (40), where the video_sequence (41) of the digital stereoscopic image video stream is identified, which may be dependent or independent (parallel images), in the sequence_header (42). If the image is TDVision® then the double buffer is activated and the changes in the aspect_ratio_information are identified. The information corresponding to the image that can be found here is read in the user_data (43). The sequence_scalable_extension (44) identifies the information contained in it and the base and enhancement layers, the video_sequence can be located here, defines the scalable_mode and the layer identifier. extra_bit_picture (45) identifies the picture_estructure, picture_header and the picture_coding_extension (46) reads the "B" type images and if it is a TDVision® type image, then it decodes the second buffer. picture_temporal_scalable_extension ( ) (47), in case of having temporal scalability, is used to decode B type images.

Namely, the sequence header (sequence_header) provides a higher information level on the video stream, for clarity purposes the number of bits corresponding to each is also indicated, the most significative bits are located within the sequence extension (Sequence_Extension) structure, it is formed by the following structures:

| Sequense_Header | | |
|---|---|---|
| Field | bits | Description |
| Secuence_Header_Code | 32 | Sequence_Header Start 0x000001B3 |
| Horizontal_Size_Value | 12 | less significative bits for width * |
| Vertical Size Value | 12 | 12 less significative bits for length |

-continued

| Sequense_Header | | |
|---|---|---|
| Field | bits | Description |
| Aspect Ratio Information | 4 | image aspect<br>0000 forbidden<br>0001 n/a TDVision ®<br>0010 4:3 TDVision ®<br>0011 16:9 TDVision ®<br>0100 2.21:1 TDVision ®<br>0111 will execute a<br>logical "and" in order to obtain<br>backward compatibility with 2D<br>systems.<br>0101 . . . 1111 reserved |
| Frame rate code | 4 | 0000 forbidden<br>0001 24,000/1001<br>(23.976) in TDVision ® format<br>0010 24 in TDVision ® format<br>0011 25 in TDVision ® format<br>0100 30,000/1001<br>(29.97)"<br>0101 30 in TDVision ® format<br>0110 50 in TDVision ® format<br>0111 60,000/1001<br>(59.94) "(will execute a logical<br>"and" in order to obtain<br>backward compatibility with 2D<br>systems.)<br>1000 60<br>1111 reserved |
| Bit_rate_value | 18 | The 18 less significative<br>bits of the video_stream bit rate<br>(bit_rate = 400 × bit_rate_value +<br>bit_rate_extension << 18) the<br>most significative bits are<br>located within the<br>sequence_extension structure. |
| Marker_bit | 1 | Always 1 (prevents<br>start_code failure). |
| Vbv_buffer_size_value | 10 | The 10 less significative<br>bits of vbv_buffer_size, which<br>determines the size of the video<br>buffering verifier (VBV), a<br>structure used to ensure that a<br>data stream can be used<br>decoding a limited size buffer<br>without exceeding or leaving too<br>much free space in the buffer. |
| Constrained_parameters_flag | 1 | Always 0, not used in<br>MPEG2. |
| Load_intra_quantizer_matrix | 1 | Indicates if an intra-<br>coded quantization matrix is<br>available. |
| If (load_intra_quantizer_matrix)<br>Intra_quantizer_matrix(64) | 8 × 64 | If a quantization matrix is<br>indicated, then it should be<br>specified here, it is a 8 × 64<br>matrix. |
| Load_non_intra_quantizer_matrix<br>If load_non_intra_quantizer_matrix | 1 | If load_non_intra_quantizer_matrix |
| Non_intra_quantizer_matrix (64) | 8 × 64 | If the previous flag is<br>activated, the 8 × 64 data forming<br>the quantized matrix are stored<br>here. |

\* The most significative bits are located within the sequence_extension structure.

| Picture_coding_extension | | |
|---|---|---|
| Field | bits # | Description |
| Extension_start_code | 32 | Always 0x000001B5 |
| Extension_start_code_identifier | 4 | Always 1000 |
| F_code(0)(0) | 4 | Used to decode motion<br>vectors; when it is a type I<br>image, this data is filled with 1111. |

-continued

| Picture_coding_extension | | |
|---|---|---|
| Field | bits # | Description |
| F_code(0)(1) | 4 | |
| F_code(1)(0) | 4 | Decoding information backwards in motion vectors (B), when it is a (P) type image it should be set to 1111, because there is no backward movement. |
| F_code(1)(1) | 4 | Decoding information backwards in motion vectors, when it is a P type image it should be set to 1111, because there is no backward movement. |
| Intra_dc_precision | 2 | precision used in the inverse quantizing of the coefficients of the DC discrete cosine transform.<br>00 8 bits precision<br>01 9 bits precision<br>10 10 bits precision<br>11 11 bits precision |
| Picture_structure | 2 | Specifies if the image is divided in fields or in a full frame.<br>00 reserved (image in TDVision ® format)<br>01 top field<br>10 bottom field<br>11 by-frame image |
| Top_field_first | 1 | 0 = decode bottom field first<br>1 = decode top field first |
| Frame_pred_frame_dct | 1 | |
| Concealment_motion_vectors | 1 | |
| Q_scale_type | 1 | |
| Intra_vic_format | 1 | |
| Alternate_scan | 1 | |
| Repeat_first_field | 1 | 0 = display a progressive frame<br>1 = display two identical progressive frames |
| Chroma_420_type | 1 | If the chroma format is 4:2:0, then it should be equal to progressive frame, otherwise it should be equal to zero. |
| Progressive_frame | 1 | 0 = interlaced<br>1 = progressive |
| Composite_display_flag | 1 | warns about the originally coded information |
| V_axis | 1 | |
| Field_sequence | 3 | |
| Sub_carrier | 1 | |
| Burst_amplitude | 7 | |
| Sub_carrier_phase | 8 | |
| Next_start_code( ) | | |

Picture_temporal_scalable_extension( )

Two spatial resolution streams exist in case of having temporal scalability, the bottom layer provides a lesser index version of the video frames, while the top layer can be used to derive a greater index version of frames of the same video. The temporal scalability can be used by low quality, low cost or free decoders, while the greater frames per second would be used for a fee.

| Picture_temporal_scalable_extension( ) | | |
|---|---|---|
| Field | bits # | Definition |
| Extension_start_code_identifier | 4 | Always 1010 |
| Reference_select_code | 2 | It is used to indicate that the reference image will be used to decode intra_coded images FOR O TYPE IMAGES<br>00 enhances the most recent images<br>01 the lower and most recent frame layer in display order<br>10 the next lower frame layer in order of forbidden display.<br>11 forbidden<br>FOR B TYPE IMAGES<br>00 forbidden<br>01 most recently decoded images in enhanced mode<br>10 most recently decoded images in enhanced mode<br>11 most recent image in the bottom layer in display order |
| Forward_temporal_reference | 10 | Temporal reference |
| Marker_bit | 1 | |

-continued

| Picture_temporal_scalable_extension( ) | | |
| --- | --- | --- |
| Field | bits # | Definition |
| Backward_temporal_reference | 10 | Temporal reference |
| Next_star_code( ) | | |

Picture_spatial_scalable_extension( )

In the case of image spatial scalability, the enhancement layer contains data, which allow a better resolution of the base layer so it can be reconstructed. When an enhancement layer is used as a function of a base layer as a reference for the motion compensation, then the bottom layer should be escalated and offset in order to obtain greater resolution of the enhancement layer.

| Picture_spatial_scalable_extension( ) | | |
| --- | --- | --- |
| Field | bits # | Definition |
| Extension_start_code_identifier | 4 | Always 1001 |
| Lower_layer_temporal_reference | 10 | Reference to the lower layer's temporal image |
| Marker_bit | 1 | 1 |
| Lower_layer_horizontal_offset | 15 | Horizontal compensation (Offset) |
| Marker_bit | 1 | 1 |
| Lower_layer_vertical_offset | 15 | Vertical compensation (Offset) |
| Spatial_temporal_weight_code_table_index | 2 | Prediction details |
| Lower_layer_progressive_frame | 1 | 1 = progressive 0 = interlaced |
| Lower_layer_desinterlaced_field_select | 1 | 0 = the top field is used 1 = the bottom field is used |
| Next_start_code( ) | | |

| Copyright_extension( ) | | |
| --- | --- | --- |
| Extension_start_code_identifier | 4 | Always 010 |
| Copyright_flag | 1 | if it is equal to 1 then it uses copyright If it is zero (0), no additional copyright information is needed |
| Copyright_identifier | 8 | 1 = original 0 = copy |
| Original_or_copy | 1 | |
| Reserved | 7 | |
| Marker_bit | 1 | |
| Copyright_number_1 | 20 | Number granted by copyright instance |
| Marker_bit | 1 | |
| Copyright_number_2 | 22 | Number granted by copyright instance |
| Marker_bit | 1 | |
| Copyright_number_3 | 22 | Number granted by copyright instance |
| Next_start_code( ) | | |

Picture_data( )
This is a simple structure, it does not have field in itself.
Slice( )
Contains information on one or more macroblocks in the same vertical position.
  Slice_start_code 32
  Slice_vertical_position_extension 3
  Priority_breakpoint 7
  Quantizer scale_code 5
  Intra_slice_flag 1
  Intra_slice 1
  Reserved_bits 7
  Extra_bit_slice 1
  Extra_information_slice 8
  Extra_bit_slice 1
  Macroblock( )
  Macroblock_modes( )
  Motion_vectors( )
  Motion_vector( )
  Coded_block_pattern( )
  Block( )
EXTENSION_AND_USER_DATA(2)
The image can be displayed in:
  DVD (Digital Versatile Disks)
  DTV (Digital Television)
  HDTV (High Definition Television)
  CABLE (DVB Digital Video Broadcast)
  SATELLITE (DSS Digital Satellite Systems); and it is the software and hardware process integration.

Figure 5:
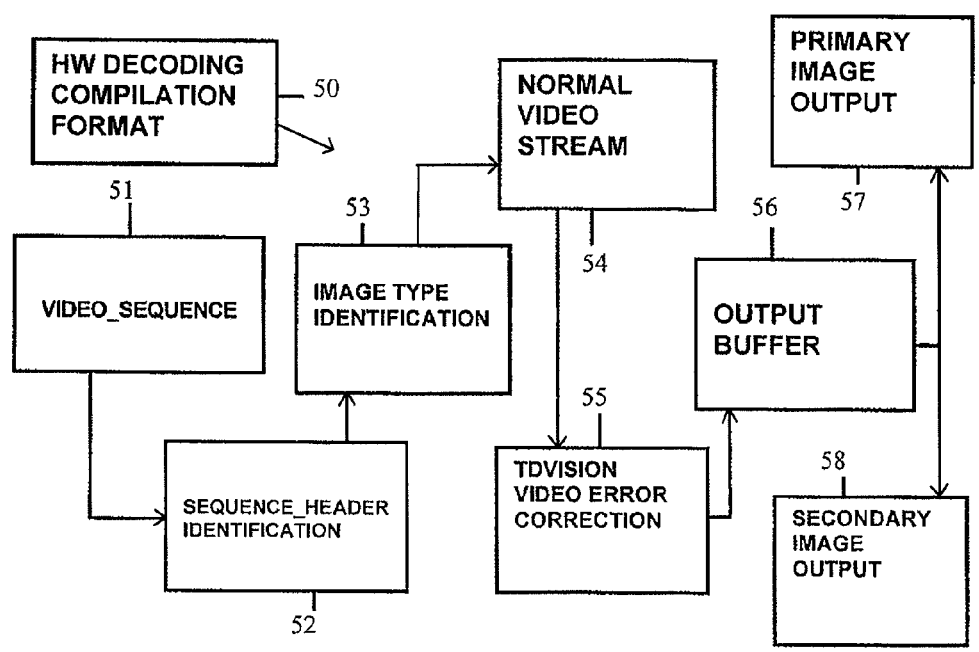
FIG. 5 is a representation of one embodiment of the decoding compilation format of the hardware.

The decoding compilation format in the hardware (50) section of FIG. 5, is duplicated in the DSP input memory, at the same time, the simultaneous input of two independent or dependent video signals is allowed, corresponding to the left-right stereoscopic existing signal taken by the stereoscopic TDVision® camera. In the procedure the video_sequence (51) is detected to alternate the left and right frames or sending them in parallel, sequence_header (52) identification, the image type (53) is identified, it passes to the normal video stream (54), then it is submitted to an error correction process (55), the video image information is sent to the output buffer (56) which in turn shares and distributes the information to the left channel (57) and the right channel (58) in said channels the video stream information is displayed in 3D or 2D.

Consists in storing both L (left) and R (right) video streams in simultaneous form as two independent video streams, but synchronized with the same time_code, so they can later be decoded and played back in parallel in large output buffers. They can also be dependent and decodified by differences.

Regarding hardware, most of the process is executed by devices known as DSP (Digital Signal Processors). As an example, namely, the Motorola and the Texas Instruments (TMS320C62X) models can be used.

These DSP are programmed by a hybrid language from C and Assembly languages, provided by the manufacturer in question. Each DSP has its own API, consisting of a functions list or procedure calls located in the DSP to be called by software. From this reference information, the 3D-images are coded, which are compatible with the MPEG2 format and with their own coding algorithm. When the information is coded, the DSP is in charge of running the prediction, comparison, quantization, and DCT function application processes in order to form the MPEG2 compressed video stream.

In order to obtain three-dimensional images from a digital video stream, certain modifications have been made to the current MPEG2 decoders, by software and hardware changes in different parts of the decoding process. The structures and the video_sequence of the video data stream should be modified to include the necessary flags to identify at the bit level the TDVision® technology image type.

The modifications are made in the next decoding steps.

Software:

Video format identification.

Application of a logical "and" for MPEG2 backward compatibility in case of not being a TDVision® video.

Image decoding in normal manner (previous technique) scanning the video_sequence.

In case of a TDVision® type image:

Discriminating if they are dependent or independent video signals

Store the last complete image buffer in the left or right channel buffer.

Apply the B type frame information decoding.

Apply error correction to the last obtained image by applying the motion and color correction vectors.

Store the results in their respective channel buffer.

Continue the video sequence reading.

Hardware:

When the information is decoded via hardware; discriminate if the image is 2D or 3D Activate a double output buffer (memory is increased).

The difference decoding selector is activated.

The parallel decoding selector is activated.

The decompression process is executed.

The image is displayed in its corresponding output buffer.

The following structures, sub-structures and sequenced will be used in specific ways; they belong to the video_sequence structure for the hardware implementation of the MPEG2 backward compatible TDVision® technology.

Actually:

Sequence_header

Aspect_ratio_information 1001 n/a in TDVision®

1010 4:3 in TDVision®

1011 16:9 in TDVision®

1100 2.21:1 in TDVision®

A logical "and" will be executed with 0111 to obtain the backward compatibility with 2D systems, when this occurs, the instruction is sent to the DSP that the buffer of the stereoscopic pair (left or right) should be equal to the source, so all the images decoded will be sent to both output buffers to allow the image display in any device.

Frame_rate_code 1001 24,000/101 (23.976) in TDVision® format 1010 24 in TDVision® format.

1011 25 in TDVision® format.

1100 30,000/1001 (29.97) in TDVision® format.

1101 30 in TDVision® format.

1110 50 in TDVision® format.

1111 60,000/1001 (59.94) in TDVision® format.

A logical "and" with 0111 will be executed in order to obtain backward compatibility with 2D systems.

User_data( )

Sequence_scalable_extension

Picture_header

Extra_bit_picture

0=TDVision®

1=normal

Picture_coding_extension

Picture-structure

00=image in TDVision® format

Picture_temporal_scalable_extension( )

At the moment of coding the information a DSP is used which is in charge of executing the prediction, comparison, and quantization processes, applies the DCT to form the MPEG2 compressed video stream, and discriminates between 2D or 3D-images.

Two video signals are coded in an independent form but with the same time_code, signals corresponding to the left signal and the right signal coming from a 3DVision® camera, sending both programs simultaneously with TDVision® stereoscopic pair identifiers. This type of decoding is known as "by parallel images", consisting in storing both left and right (L and R) video streams simultaneously as two independent video streams, but time_code-synchronized. Later, they will be decoded and played back in parallel. Only the decoding software should be decoded, the coding and the compression algorithm of the transport stream will be identical to the current one.

Software modifications in the decoder.

In the decoder, two program streams should be programmed simultaneously, or two interdependent video signals, i.e., constructed from the difference between both stored as a B type frame with an identifier, following the programming API as in the example case, in the use of the TMS320C62X family Texas Instruments DSP.

DSP's programming algorithm and method.

Create two process channels when starting the DSP (primary and secondary buffers or left and right when calling API).

Get the RAM memory pointers for each channel (RAM addresses in the memory map)

When a TDVision® type video sequence is obtained it is taken as B type the image is decoded in real-time the change or difference is applied to the complementary buffer the results are stored in the secondary buffer.

In that related to the software in the video_sequence data stream, two options are implemented:

1.—One modifies only the software and uses the user_data( ) section to store the error correction that allows to regenerate the stereoscopic signal.

2.—The other enables by hardware the PICTURE_DATA3D( ) function which is transparent to MPEG2-compatible readers, and which it can be decoded by a TDVision®-compatible DSP.

At the moment that the MPEG2 decoder detects a user_data( ) code, it will search the 3DVISION_START_IDENTIFIER=0X000ABCD 32-bit identifier, which is an extremely high and difficult to reproduce code, or which does not represent data. Then, the 3D block length to be read will be taken into account, which is a 32-bit "n" data. When this information is detected within the USER_DATA( ) a call to the special decoding function will be made which is then compared to the output buffer and applied from the current read offset of the video_sequence, the n bytes as a typical correction for B type frames. The output of this correction is sent to other output address, which is directly associated to a video output additional to that existing in the electronic display device.

If the PICTURE_DATA3D( ) structure is recognized, then it proceeds to read the information directly by the decoder; but it writes the information in a second output buffer, which is also connected to a video output additional to that existing in the electronic display device.

In case of the program stream, two signals (left and right) are synchronized by the time_code, which will be decoded in parallel by a MPEG decoder with enough simultaneous multiple video channels decoding capability, or which can send two interdependent video signals within the same video_sequence, e.g., "R-L=delta", where delta is the difference stores as a "B" type frame with stereoscopic pair TDVision® identifier and which can be reconstructed at the moment of the decoding by differences from the image, i.e., "R-delta=L" or "L-delta=R", as in the case of the aforementioned Texas Instruments DSP, which is considered as an illustrative but not limiting example.

A video containing a single video sequence is also implemented; but alternating the left and right frames at 60 frames per second (30 frames each) and when decoded place the video buffer image in the corresponding left or right channel.

It will also have the capacity of detecting via hardware if the signal is of TDVision® type, if this is the case, it will be identified if it is a transport stream, program stream or left-right multiplexion at 60 frames per second.

In the case of the transport stream the backward compatibility system is available in the current decoders, having the ability to display the same video without 3d characteristics but only in 2D, in which case the DSP is disabled to display the image in any TDVision® or previous technique device.

In the case of the program stream unmodified coders are used, such as those currently used in satellite transmission systems; but the receptor and decoder have a TDVision® flag identification system, thus enabling the second video buffer to form a left-right pair.

Finally, in the case of multiplexed video, the MPEG decoder with two video buffers (left-right) is enabled, identifying the adequate frame and separating each signal at 30 frames per second, thus providing a flickerless image, as the video stream is constant and due to the characteristic retention wave of the human eye the multiplexion effect is not appreciated.

Particular embodiments of the invention have been illustrated and described, it will be obvious for those skilled in the art that several modifications or changes can be made without departing from the scope of the present invention. All such modifications and changes are intended to be covered by the following claims, so that all changes and modifications fall within the scope of the present invention.

I claim:

1. A system for displaying a stereoscopic digital video to a user, the system comprising:
    a receiver configured to receive a first video stream and a second video stream, the first video stream comprising a first eye image and a header comprising bits, the second video stream comprising a delta, wherein the delta was calculated by determining a difference between the first eye image and a second eye image, wherein the first video stream and the second video stream comprise a time code;
    a decoder configured to decode video streams;
    a first bit pattern stored in the receiver and configured to indicate to the decoder that the digital video is not a stereoscopic digital video;
    a second bit pattern stored in the receiver and configured to indicate to the decoder that the digital video is a stereoscopic digital video, wherein the decoder is configured to:
        receive the header in the first video stream and read the bits in the header,
        compare the received bits with the first bit pattern and the second bit pattern, and
        output a stereoscopic digital video when the received header comprises bits that match the second bit pattern, wherein the stereoscopic digital video comprises the first eye image and a decoded second eye image formed by comparing the delta to the first eye image; and
    a video output configured to output the stereoscopic digital video.

* * * * *